June 24, 1958   M. COVEN ET AL   2,840,383
STROLLER
Filed Feb. 7, 1957   2 Sheets-Sheet 2
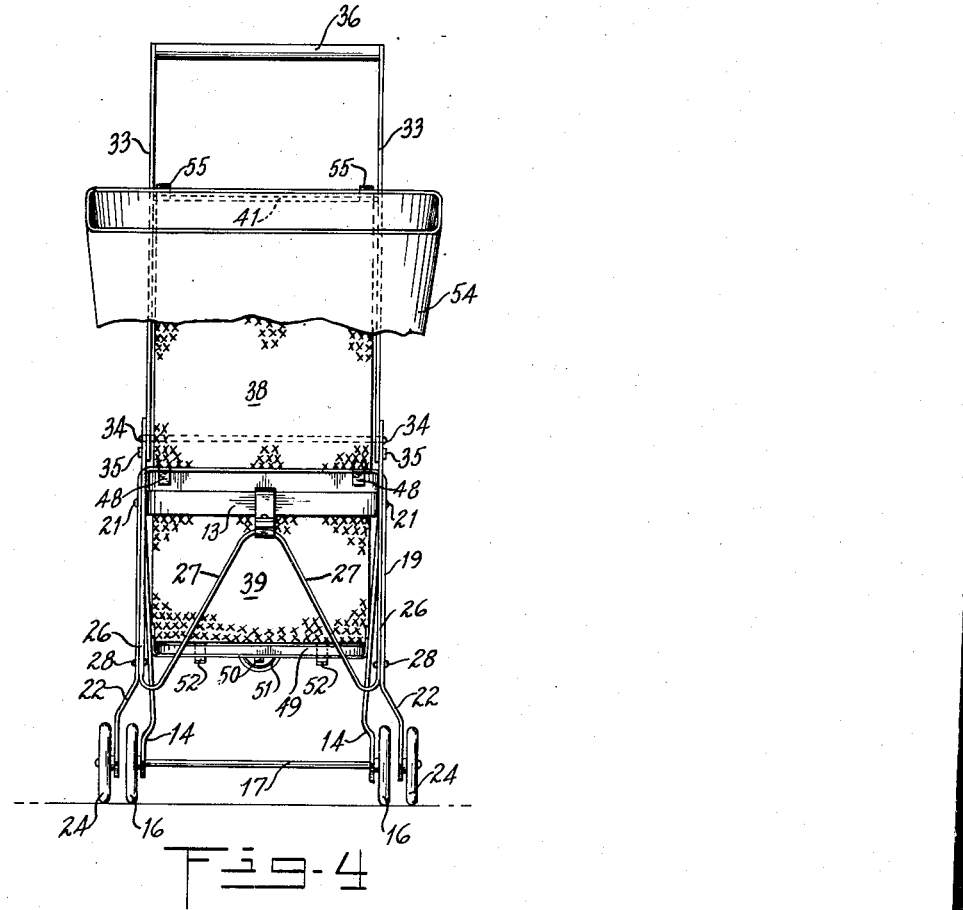
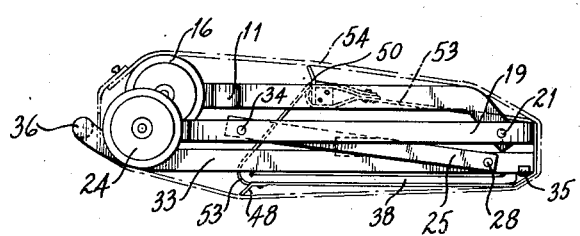
INVENTORS
MURRAY COVEN
BY FERDINAND T. WIEHL
Frank Mahora
ATTORNEY

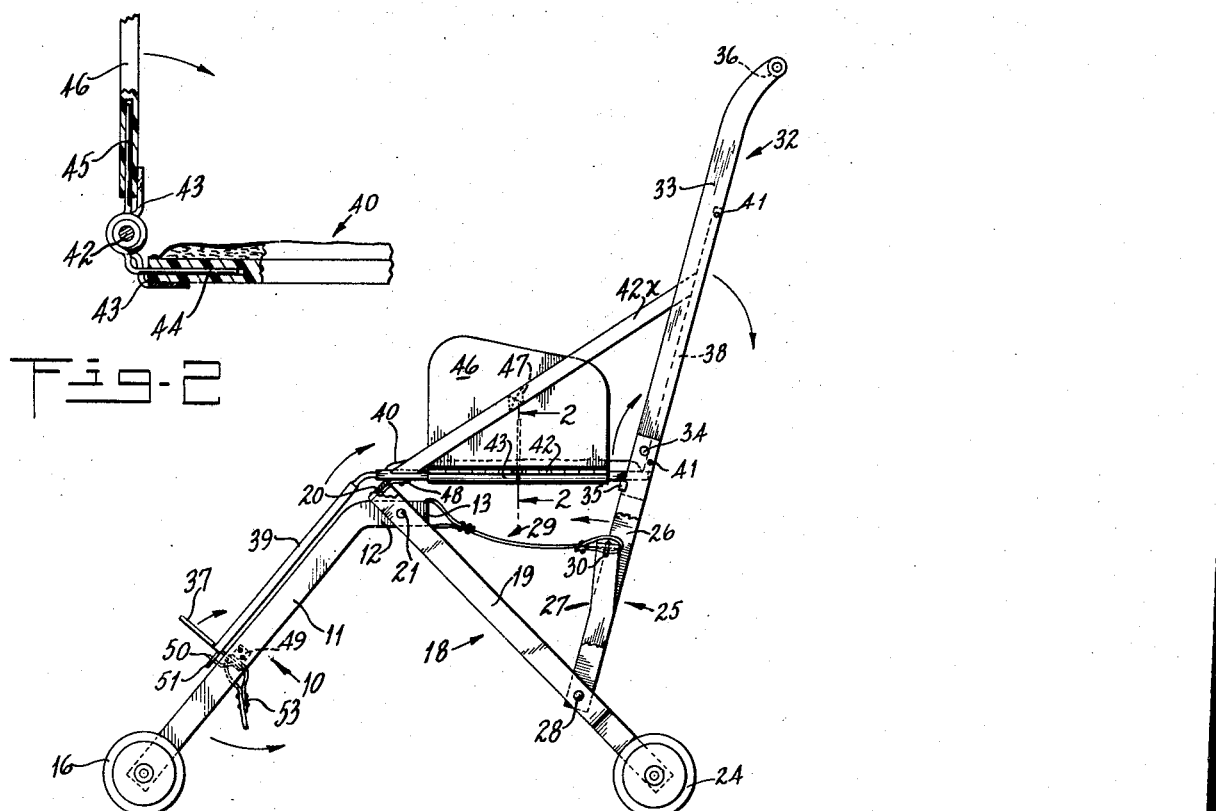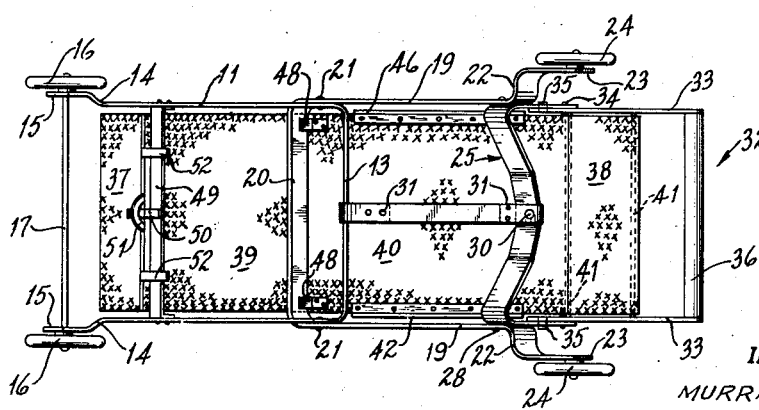

2,840,383

STROLLER

Murray Coven, Flushing, and Ferdinand T. Wiehl, Brooklyn, N. Y.

Application February 7, 1957, Serial No. 638,746

4 Claims. (Cl. 280—41)

This invention relates to a stroller and more particularly to a collapsible stroller, collapsible to a minimum bulk to permit easy transportation in the collapsed condition.

It is an object of this invention to provide a stroller which when collapsed will be small bulk and easily portable by a woman.

It is a further object to provide a stroller which is easily extended from its collapsed condition into its stroller condition and further which is easily and rapidly collapsed from its stroller condition.

These and other objectives of this invention will become apparent upon reading the following descriptive disclosure taken in conjunction with the drawing in which;

Fig. 1 is a side elevation of the stroller,

Fig. 2 is a section view taken on line 2—2 of Fig. 1,

Fig. 3 is a bottom view of the stroller,

Fig. 4 is a rear view of the stroller showing in part the combination stroller carrying bag functioning as a shopping bag, and Fig. 5 is a side view of a collapsed stroller disposed in a transparent carrying bag.

Turning to the drawing and particularly to Fig. 1, a front U-shaped carriage member 10 is provided with a pair of depending forwardly disposed legs 11 integral with horizontally disposed leg extensions 12, said extensions being integral with a cross bar 13 (Fig. 3).

The front portion of legs 11 are preferably provided with integral angularly and outwardly disposed leg segments 14 and with integral terminal leg segments 15, the latter being thus disposed in a plane outwardly and in space-relationship to the planes of the legs 11. An axle 17 may be used to join the wheels 16, but the wheels 16 may be secured by conventional means individually to its respective terminal segment 15.

A middle U-shaped carriage member 18 (Fig. 1) is provided with a pair of depending rearwardly disposed legs 19 integral with a top front cross bar 20. The distance between legs 19 is greater than the distance between legs 11 so that the middle carriage member 18 is disposed over the front carriage 10 and pivotally secured together by a pair of rivets 21 (Fig. 3).

As shown in Fig. 3, the legs 19 are provided with integral outwardly disposed segments 22 which in turn are each provided with integral terminal leg segments 23 to which are attached individual conventional wheels 24 secured by individual conventional axles. The spacing of wheels 24 outwardly of legs 19 by segments 22 is such as to permit nesting of the wheels 16 within the legs 24 when the stroller is collapsed (Figs. 5 and 4).

A rear W-shaped carriage member 25 is provided with a pair of spaced-apart upright straight arms 26 integral with an inverted V-shaped cross bar 27.

As shown in Fig. 1, the inverted V-shaped cross bar 27 has, preferably, its curvatured apex tilted forward to facilitate better nesting (Fig. 5), but units where such tilting is absent are operable though they collapse into a slightly less compact space.

The W-shaped carriage member 25 is pivotally secured at the base of each of its arms 26 to the respective legs 19 by a rivet 28. A flexible strap 29 is looped at its front around cross bar 13 of carriage member 10 and looped at its rear about the apex of the inverted V-shaped member 27 and secured fixedly to the apex by a rivet 30, thereby preventing sliding of the loop from the very apex of member 27. The loops are secured by means of rivets 31. The strap is of suitable pre-determined length to permit and limit a suitable movement of the rear W-shaped carriage member 25 from middle carriage member 18.

As shown in Figs. 4 and 3, a U-shaped handle member 32 having a pair of depending legs 33 is pivotally secured at the base of each of its legs 33 to the top ends of the respective upright arms 26, by rivets 34. A stop clip 35 is secured fixedly as by welding or other conventional means to the front edge of the lower leg of legs 33 to stop or limit the rotation of the legs 33 about pivots 34 as a unit when the legs 33 become linearly disposed and in alignment with legs 26, by engaging said legs 26.

The handle 32 may be provided with a conventional plastic cross-bar 36 or it may have an integral cross bar (not shown). Either form of handle as well as other handle grips are operable. Also while the carriage structural members are preferably made of flat bar stock, tubular or round stock members are also operable. And while the structural members are preferably made of aluminum, other metals such as steel are operable.

The basis of this invention lies in the carriage structure, but a seat must be provided to make the structure a stroller suitable for carrying a child.

While a variety of seats may be secured to the carriage or chassis structure, the following foldable seat structure is preferred.

The preferred seat has fabric hinges at the fold joints said fabric being preferably a continuous strip running the full length of the seat from and including the foot rest plate portion 37 to and including the back rest portion 38, including the intermediate leg rest portion 39 and the seat portion itself 40. Each of the various weight supporting seat portions such as the leg, foot, seat, and back portions may be provided with a rigid panel of plastic, steel, plywood or like material and this panel material may be used in conjunction with a single fabric or plastic sheet interconnecting the said panels, or by a pair of fabric or plastic sheets with a continuous sheet disposed on each side of the various panels. The fabric may be secured to the various panels by sewn threads, rivets, plastic adhesive, or other conventional means. Seats made foldable by metal hinges, for example piano hinges, at the joints between the various enumerated above panels are also operable.

In the preferred seat structure, the back rest 38 is secured at its top and bottom about horizontal rods 41 disposed transversely through respective opposed legs 33 of the handle 32. Thus back rest 38 is firmly and immoveably in place between the legs 32 of the handle.

The seat 40 is also secured to the back rest 38 by a pair of flexible straps 42 secured therebetween and thereto as by sewn threads. A suitable piano hinge 42 having a co-acting tension spring 43 about the hinge axis is disposed in each side of the seat 40 and rigidly secured therein by disposing hinge tong 44 into a suitable cavity located in the seat side wall.

As shown in Fig. 2 the other hinge tong 45 is disposed in the stroller side wall 46. A respective strap 42X is secured as by sewn threads 47 to a respective stroller side wall 46. The hinge 42 is continuously urged into the open position (Fig. 2) by spring 43. Thus when the seat is unfolded the stroller side walls 46 become upright automatically.

A pair of suitable space-apart stop lugs 48 are riveted to the bottom front edge of seat 40 and engage the cross bar 20 of frame member 18 to prevent forwarded movement of seat 40. A cross bar 49 is riveted between legs 11 of frame member 10 and it is provided with a fixed tongue 50 in its middle point between legs 11.

The leg rest 39 is provided with a protruding capture loop 51 extending from the base of the leg rest 39 and secured therein fixedly as by press fit, rivets or other conventional means. The tongue 50 is inserted in the loop 51 of the leg rest 39 thereby securing it in place. Also a rectangular panel foot rest 37 is provided preferably with a pair of spaced-apart prongs 52 protruding from the panel edge hingedly secured to the leg rest. Prongs 52 are rigidly and conventionally secured to or optionally integral with the rigid panel foot rest 37.

A tie strap 53 of flexible fabric is provided with a loop about cross bar 49 and its free end is provided with a female snap button element to co-act with a male snap button element disposed on the exterior of the strap 53 loop so that the folded stroller may be tied together by the tie strap 53 (Fig. 5).

In folding the stroller from its stroller position (Fig. 1) to its collapsed position (Fig. 5) the foot rest plate 37 is folded in the direction of the arrow onto the leg rest plate 39, whereupon the leg rest plate is folded onto seat 40. Next the stroller sides 46 are each turned inwardly upon seat 40 and the seat with the folded panels thereon is then disconnected from the element 10 and the entire thus far folded assembly is then folded against the back rest 38.

Next, the assembled seat on the back rest 38 is tilted along with the handle 32 as a unit backwardly as shown by an arrow (Fig. 1). Then front carriage frame 10 is moved toward the middle carriage frame 18 simultaneously as the W-shaped carriage frame 25 with attached handle assembled is also moved toward the middle frame 18, thereby producing the folded stroller shown in Fig. 5, Tying of the tie strap 53 about the various cross bars of the carriage frame produced a unitary structure with the handle exposed for easy grasping. The tie-up unit may be rested on the end opposed to handle 36 (Fig. 5) in a self supporting up-right position. Preferably a carrying bag 54 is provided so that the soiled wheels of the folded carriage does not soil the clothes.

The bag 54 is provided with spaced-apart hanger clips 55 (Fig. 4) so that the bag doubles in function as a shopping bag also. The bag 54 may be of a plurality of constructional forms and is provided with an opening in the flap to permit the handle 56 to protrude therefrom. Thus the bag encased folded stroller may be carried by the protruding handle 36, protruding from the flap opening in the bag. Such a folded encased stroller may be carried on the lap of a person in a bus or streetcar.

In unfolding the stroller, the bag is removed and with a single outward motion of the held handle 36 the various hinged and seat elements automatically fall onto place.

This invention is of generic or broad scope and is merely illustrated by the embodiment shown and described herein and therefore is not limited to this illustrative embodiment.

This application is a continuation-in-part of Ser. No. 614,752 filed October 8, 1956, now Patent No. 2,809,377.

We claim:

1. A collapsible stroller comprising a U-shaped front outwardly disposed hinge carriage member; a U-shaped middle hinged carriage member hinged at its top to the top of said front member; a W-shaped rearwardly disposed carriage member, the opposed upright arms of which are integrally connected to the inverted V-shaped member therebetween, said W-shaped member being pivotally secured at the base of said upright arms to the bottom of said middle member; a U-shaped handle member hingedly secured to the top ends of said upright arms, and flexible means secured to the apex of said V-shaped member and to the top of said front member to limit the outward movement of said rear carriage member.

2. The stroller of claim 1 comprising said front U-shaped member having a top cross bar and depending legs, and said middle U-shaped member having a top cross bar and depending legs disposed exteriorly of and pivotally to said front member whereby rotation of said exterior cross bar of said middle carriage engages the legs of said front carriage member stopping further rotation of said middle member relative to said front member.

3. The apparatus of claim 2 wherein said front U-shaped member is provided with opposed horizontal leg portions integral with said depending leg portions, said middle U-shaped member being hinged to said horizontal leg portions.

4. The apparatus of claim 3 wherein the inverted V-shaped element of said W-shaped rear frame member is provided with an apex tilted inwardly toward said middle frame member.

References Cited in the file of this patent

UNITED STATES PATENTS

| 1,716,916 | Brown | June 11, 1929 |
| 1,968,333 | Cross et al. | July 31, 1934 |
| 2,429,763 | Lindabury | Oct. 28, 1947 |

FOREIGN PATENTS

| 443,051 | Great Britain | Feb. 20, 1936 |